US006429967B1

(12) United States Patent
Amos

(10) Patent No.: US 6,429,967 B1
(45) Date of Patent: Aug. 6, 2002

(54) CONFOCAL OPTICAL MICROSCOPE, MAGNIFYING ATTACHMENT THEREFOR AND METHOD OF USE THEREOF

(75) Inventor: William Bradshaw Amos, Cambridge (GB)

(73) Assignee: Medical Research Council, London (GB)

( * ) Notice: Subject to any disclaimer, the term of this patent is extended or adjusted under 35 U.S.C. 154(b) by 0 days.

(21) Appl. No.: 09/807,829

(22) PCT Filed: Feb. 18, 2000

(86) PCT No.: PCT/GB00/00572

§ 371 (c)(1), (2), (4) Date: Jun. 4, 2001

(87) PCT Pub. No.: WO00/50948

PCT Pub. Date: Aug. 31, 2000

(30) Foreign Application Priority Data

Feb. 23, 1999 (GB) ............................................ 9904150

(51) Int. Cl.[7] ............................................ G02B 21/00

(52) U.S. Cl. ...................... 359/381; 359/368; 359/390; 359/432

(58) Field of Search ................................ 359/368–390; 250/216, 234, 235

(56) References Cited

U.S. PATENT DOCUMENTS 5,032,720 A 7/1991 White ........................ 250/236
5,218,475 A 6/1993 Tushida ...................... 359/673
5,334,830 A * 8/1994 Fukuyama et al.
5,576,897 A 11/1996 Kuo ........................... 359/822
5,765,049 A 6/1998 Hase ........................... 396/73
5,815,311 A 9/1998 Ishikawa .................... 359/381
6,072,624 A * 6/2000 Dixon et al.
6,285,019 B1 * 9/2001 Engelhardt et al.

FOREIGN PATENT DOCUMENTS

| | | | |
|---|---|---|---|
| EP | 0 463 220 | | 1/1992 |
| JP | 11-237557 | * | 8/1999 |
| WO | WO 98/52084 | | 11/1998 |

* cited by examiner

*Primary Examiner*—Thong Nguyen
(74) *Attorney, Agent, or Firm*—Lee, Mann, Smith, McWilliams Sweeney & Ohlson

(57) ABSTRACT

An optical attachment unit is described which can be inserted reversibly into the detection light path of a confocal optical microscope, which has the effect of modifying the magnification of the specimen at the level of the detector iris. This modification consists in the preferred form of a demagnification, so that high sensitivity is obtained at the expense of confocal function, as is required for multiphoton imaging and other purposes. No optical telescope or other imaging system used for confocal function is disturbed or removed by the operation of inserting the unit, so that the confocal function can be restored reproducibly and rapidly.

9 Claims, 3 Drawing Sheets

28
27

CONFOCAL OPTICAL MICROSCOPE, MAGNIFYING ATTACHMENT THEREFOR AND METHOD OF USE THEREOF

FIELD OF THE INVENTION

This invention relates generally to scanning optical microscopes with a confocal capability.

BACKGROUND OF THE INVENTION

A confocal optical microscope is one in which a single spot of illumination is focused on to a specimen and a detector of light receives light derived from that spot only. An image is built up progressively by scanning the spot over the specimen or by scanning the specimen relative to a stationary spot Minsky (U.S. Pat. No. 3,013,467) first described such a microscope, including the use of a pinhole aperture and optical means by which the light from the specimen was focused on that aperture. This and other early apparatus suffered from the difficulty that the pinhole aperture was required to be very small for optimum confocal operation. For example, Wilson and Carlini, in an article published in the Journal of Microscopy 149, pp 51–66 (1988) calculated that for a commonly-used type of microscope objective lens, the optimum pinhole diameter was 10 $\mu$m. This made the manufacture and correct alignment of confocal microscopes difficult. White (U.S. Pat. No. 5,032,720) taught the use of a large extra optical magnification in such a microscope, allowing the use of an aperture of several millimeters in diameter without compromise of the confocal function of the microscope. In the apparatus of White, the extra magnification was achieved by using the microscope eyepiece to project a real image through a very large distance (greater than 1 meter). It is well known to those skilled in the art of optics that magnification can also be achieved by means of a telescope. Fukuyama (U.S. Pat. No. 5,225,671) described two types of telescope for this purpose, namely a Galilean telescope consisting of a positive and a negative lens and a catadioptric telescope consisting of convex and concave reflecting elements. In a brochure published by Bio-Rad Ltd., a model of confocal scan head (microRadiance) is shown with a telescope consisting of two positive lenses.

It is desirable to be able optionally to remove the extra magnification, making the scan head non-confocal. This is required, for example, to increase the signal strength at the detector, or to decrease the optical-sectioning property of the microscope to facilitate searching in three dimensions for a specimen feature. Another important reason is to collect more signals in a multiphoton epifluorescence microscope than can be collected with confocal geometry. The desirability of the latter is discussed by Denk, Piston and Webb in The Handbook of Biological Confocal Microscopy edited by J. Pawley, pp 445–458 Plenum Press (1995). A disadvantage of the telescope-based systems described above is that the lenses or mirrors of the telescope must be positioned very precisely, so it is difficult to remove the telescope, substitute optics giving a lower magnification and then replace the telescope in a sufficiently reproducible way. For example, the telescope used in a system manufactured by Bio-Rad Ltd. has a power of approximately 15 times. The lateral tolerance in projecting the spot on to the detector iris is 0.2 mm at 160 mm distance, which corresponds to 1.2 mrad of angle. The mechanical tolerance in angular position of the telescope axis is 1.2/15 or 0.08 mrad, which is difficult to maintain by ordinary mechanical mountings.

The present application concerns a scanning optical microscope with means by which the magnification at the detector diaphragm can be varied by the introduction of an additional optical unit which can be inserted or removed without disturbing the telescope, thus allowing rapid and accurate switching to and from confocal function.

The invention can be viewed as an improvement over the disclosure of U.S. Pat. No. 5,334,830.

THE INVENTION

According to the invention, there is provided a scanning optical microscope having a telescope and a light detector with a detector aperture through which in use light from a specimen is focussed on the detector, in combination with an attachment comprising a unit having optical power insertable into the light path through the microscope in order to alter the magnification of the image of the specimen in the plane of the detector aperture, wherein the microscope is a confocal microscope without the unit inserted in the light path and a non-confocal microscope with the unit inserted in the light path, characterised in that the unit is insertable into the light path at a location between the telescope and the light detector.

The present invention thus provides a scanning optical microscope with an attachment unit which can be inserted reversibly into and out of the light path of a confocal microscope leading to the detector which, when inserted, modifies the magnification of the real image of the object at the level of the detector aperture or iris. Preferably, the unit consists of lens or reflector assemblies of positive and negative power which cause the magnification of the image in the plane of the detector iris to be changed. The unit is used in addition to the telescope and keeps the apparent position of the exit pupil of the telescope constant. If, during confocal imaging, a collector lens is used between the detector and the confocal iris to image the exit pupil of the telescope on the detector, the collector lens preferably continues to function in this way even when the unit has been inserted and special features of the design of the unit can make this possible. The method of use of this unit varies according to the magnification the unit produces and mode of imaging. A form providing a negative magnification (i.e. reducing the magnification of the telescope) can be used preferably with the detector iris fully open, to maximise signal collection in multiphoton imaging and to provide high-sensitivity epifluorescence imaging without confocal performance. A form providing positive magnification can be used with a restricted aperture to improve confocal performance or to allow the use of special non-standard aperture masks.

DESCRIPTION OF THE EMBODIMENTS

The present invention concerns a focusing optical attachment unit which is added to a confocal optical microscope to modify its performance or render it non-confocal. It should be noted that the unit could be constructed out of reflective optical elements, with the advantage of achromatic performance, but in the following discussion, for the sake of simplicity, reference will be made exclusively to forms constructed of lenses. It should be noted also that no reference will be made to the light source, laser or otherwise, or the input aperture or any optics which are necessary for the illumination or for introducing the illuminating light into the microscope. The illuminating means for confocal epifluorescence and multiphoton epifluorescence is now well known and its presence is to be assumed in all the discussion that follows, although these features are omitted from FIG. 1 and FIG. 2.

Figure 1:
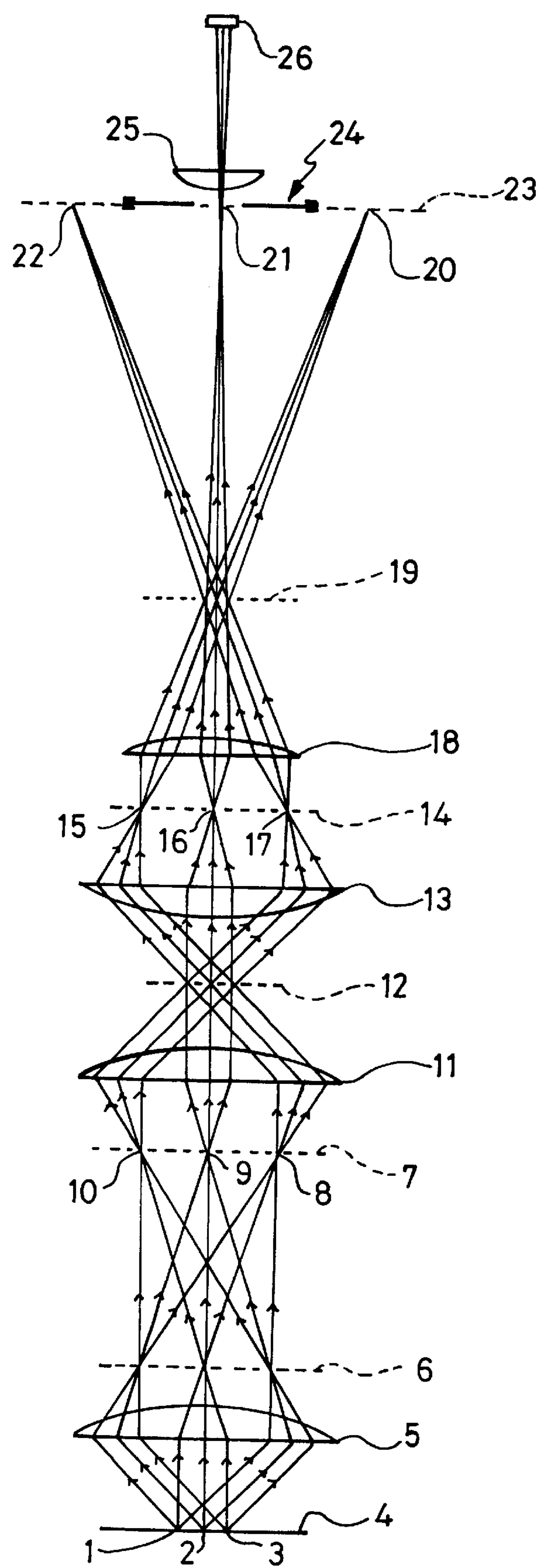
FIG. 1 is a pictorial optical schematic diagram of a confocal microscope according to the prior art. In this diagram, as also in FIG. 2, the light source, input aperture and the means by which light is introduced into the microscope are all omitted in order to simplify the drawings.

FIG. 1 shows the prior art of a confocal optical microscope. Points 1, 2 and 3, lying in a plane 4 within the microscope specimen are the origin of rays which pass through an objective lens 5 with an exit pupil in the plane shown at 6. For the purpose of simplicity, the exit pupil is considered to lie in the back focal plane of the objective lens. Points 1, 2 and 3 are imaged at 8, 9 and 10, respectively, in the intermediate image plane 7 of the microscope. An eyepiece or scan lens 11 renders the light passing through each of the image points 8, 9 and 10 parallel, and the parallel ray pencils all pass through the so-called Ramsden disk, the central area of the plane at 12, which is, in fact, an image of the exit pupil of the objective. All the foregoing is absolutely conventional and generally true of any optical microscope. The extra magnification taught by White and hitherto mentioned was achieved in White's original design by allowing the parallel beams emerging from the Ramsden disk to form an image at a large distance from the eyepiece, without extra optics. FIG. 1, however, shows the now more conventional design, in which a telescope is used. The telescope shown comprises a positive lens of longer focal length 13 followed by a positive lens of shorter focal length 18. Lens 13 images the specimen points 1, 2 and 3 at points 15, 16 and 17 in plane 14. Lens 18 produces a highly magnified real image of these points at 20, 21 and 22 respectively in an image plane 23 containing a variable confocal aperture in the form of an iris at 24. It is to be noted that all the light from the telescope passes through an exit pupil in the plane 19 which is an image of the exit pupil of the objective, as is the Ramsden disk at 12. Light which passes through the detector aperture at 24 enters a collector lens 25 which images the exit pupil of the telescope at 19 on the detector 26 or some equivalent device, such as the core of an optical fibre or the entrance of a spectrometer. The way in which the microscope shown in FIG. 1 can function confocally may be seen if it is supposed that only the axial point at 2 is illuminated by a diffraction-limited spot of light. Detection will be confined to this point and its immediate environment: any light scattered through points 1 or 3 is directed to 20 and 22 and is not able to pass to the detector.

Figure 2:
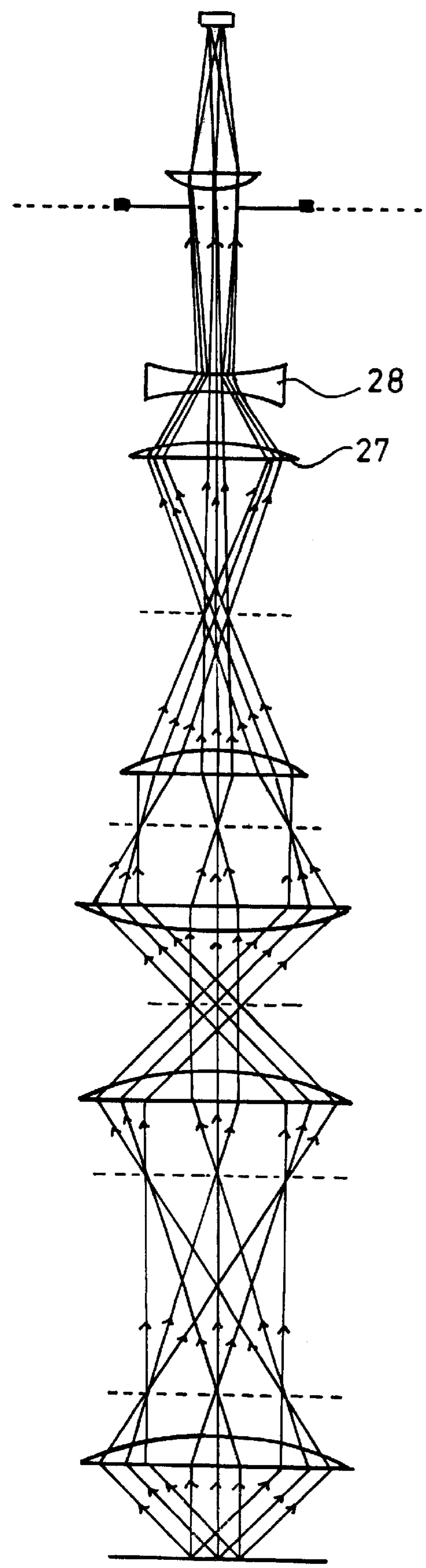
FIG. 2 is a diagram of the microscope of FIG. 1, but showing the attachment unit of the invention inserted and its optical effect.

FIG. 2 resembles FIG. 1, except that the attachment unit forming part of the invention is shown inserted between the telescope and the detector iris diaphragm. In this preferred form, the unit consists of a positive lens assembly, symbolized in the diagram by a single lens 27, followed by a negative lens assembly, also symbolized by a single lens, at 28. The effect of these assemblies, which are constructed as one unit, is that the images of specimen points 1, 2 and 3 are brought closer together, so they lie within the detector iris and so the light from them passes to the detector. Also, the exit pupil of the telescope is imaged as before on the detector. The required focal lengths for lenses 27 and 28 can be calculated from the well-known lens formula relating object and image distances to the focal length. Lens 27 is required to image the exit pupil beyond lens 28; this results in a (negative) object distance for lens 28 and the focal length for lens 28 is that required to produce a virtual image at the original position of the telescope exit pupil.

Figure 3:
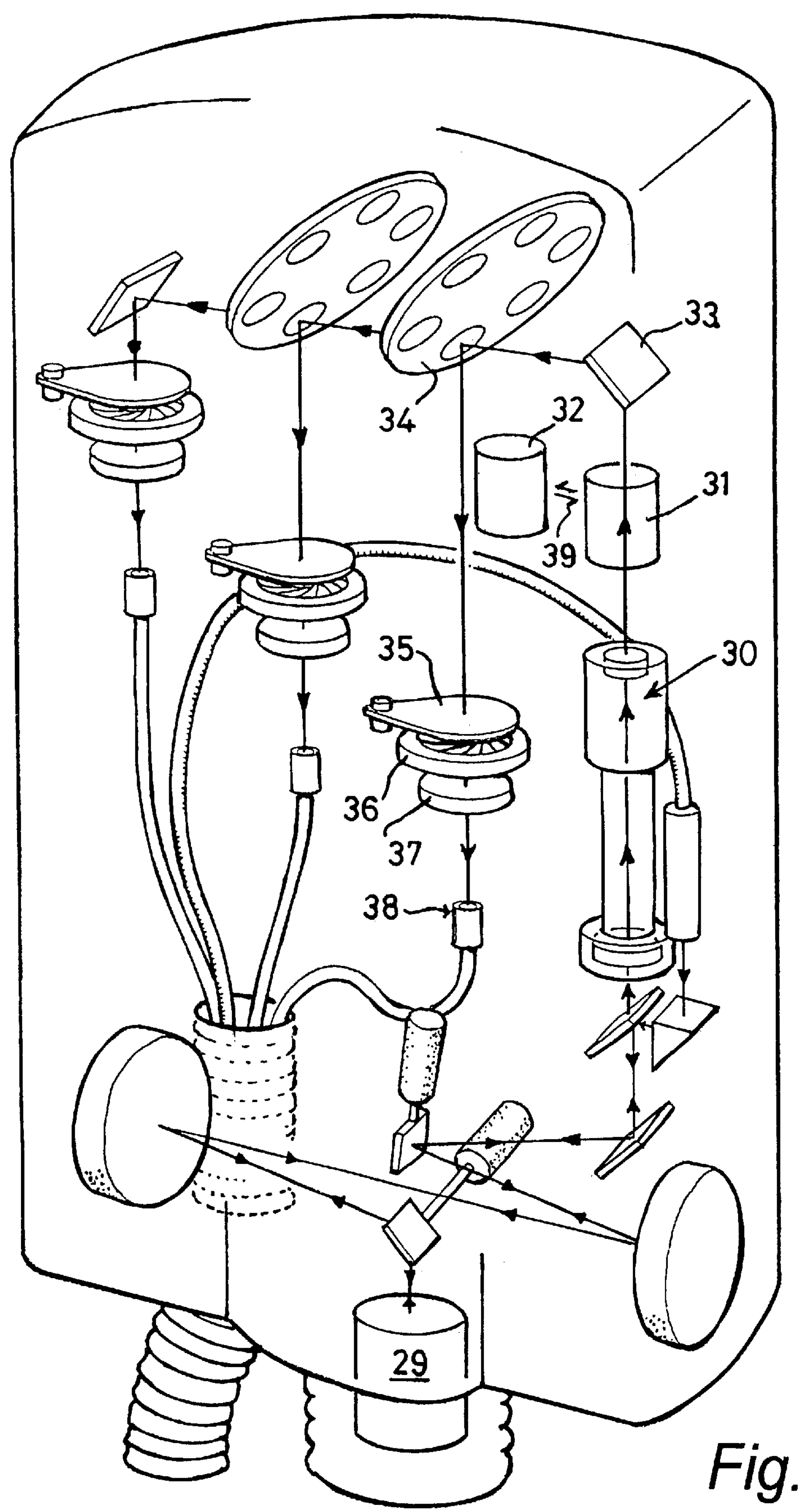
FIG. 3 is a schematic diagram of the engineering construction of a commercially-manufactured confocal microscope, showing the present invention inserted into the optical train. The diagram is based on the 'Radiance Plus' model, manufactured by Bio-Rad Ltd.

FIG. 3 is a schematic engineering diagram of a confocal scan head corresponding to the Radiance Plus model, manufactured by Bio-Rad Ltd. This scan head is attached to a conventional optical microscope and converts it into a confocal epifluorescence microscope. Light from the scanning eyepiece 29 passes from the specimen through a complex scanning arrangement and ultimately as a stationary beam into a telescope mounted in a tube 30, containing a lower (with reference to the diagram) lens of long focal length and an upper lens of short focal length, both lenses being positive. The tube is fixed permanently in the frame of the scan head during manufacture, to avoid any angular misalignment, as hitherto described. The unit in accordance with the invention is placed in the light path at 31 and may be swung out by means of a servo motor to position 32 to restore the scan head to normal confocal function. The means for swinging the unit in and out of the light path are shown at 39 in FIG. 3. The light emerging from 31 is redirected by reflector 33 and a portion of it is reflected by a chromatic reflector at 34 so that it passes through a polariser 35 (optionally present in the path) and thus to the confocal iris at 36, the collector lens 37 and a multimode optical fibre at 38 by which means it is conducted to the detector. When the attachment of the invention is swung out of the light path, confocal function is restored immediately, since the telescope remains fixed throughout.

The method for operating the microscope and unit according to the invention is as follows: when a specimen is first being examined, or in other situations where the highest optical sensitivity and least depth discrimination are required, the unit is swung into the path and preferably the iris is opened fully. This results in an increase in epifluorescence signal by a factor of 3× to 8× during experimental tests. The same adjustments are made during multiphoton fluorescence imaging, where the presence of a confocal aperture is not necessary for imaging and where it is desirable to detect all the emitted light, including that which is scattered in the specimen into regions remote from the focused illumination spot.

Also envisaged within the scope of the invention are forms in which the removable unit consists of positive and negative lenses in the reverse order to that given above, constituting a magnifying rather than a demagnifying accessory. The advantage of this is that a closer approach to ideal confocal performance can be made when the specimen is bright enough for a smaller aperture size to be used. This means that the minimum effective aperture size is no longer limited to the minimum diameter of the mechanical iris. Another advantage is that apodising apertures or other specialized apertures or quadrant diodes or other detectors can be inserted with reduced need for accuracy in the mechanical placement and centering of these components.

What is claimed is:

1. A scanning optical microscope having a telescope and a light detector with a detector aperture through which in use light from a specimen is focussed on the detector, in combination with an attachment comprising a unit having optical power insertable into a light path passing through the microscope in order to alter magnification of an image of the specimen in a plane of the detector aperture, wherein the microscope is a confocal microscope without the unit inserted in the light path and a non-confocal microscope with the unit inserted in the light path, characterized in that the unit is insertable into the light path at a location between the telescope and the light detector.

2. The combination claimed in claim 1, wherein insertion of the unit into the light path serves to reduce the image magnification in the plane of the detector aperture.

3. The combination claimed in claim 1, wherein the unit comprises an element having positive optical power and an element having negative optical power.

4. The combination claimed in claim 3, wherein light passes from the positive power element to the negative power element when the unit is inserted into the light path.

5. The combination claimed in claim 3, wherein the positive and negative power elements consist of lenses.

6. The combination claimed in claim 1, wherein insertion of the unit into the light path produces said alteration in magnification without any shift in the positioning of other optical components forming part of the microscope.

7. The combination claimed in claim 1, wherein the telescope has an exit pupil which is focused on the detector, or on the core of an optical fiber leading to the detector, whether or not the said attachment unit is inserted into the light path.

8. The combination claimed in claim 1 wherein the attachment also comprises means for swinging the unit into and out of the light path.

9. The combination claimed in claim 1, wherein the detector aperture is an iris diaphragm.

* * * * *